No. 774,477. PATENTED NOV. 8, 1904.
W. H. JEWETT.
ADJUSTABLE SHADE.
APPLICATION FILED JUNE 22, 1904.
NO MODEL.
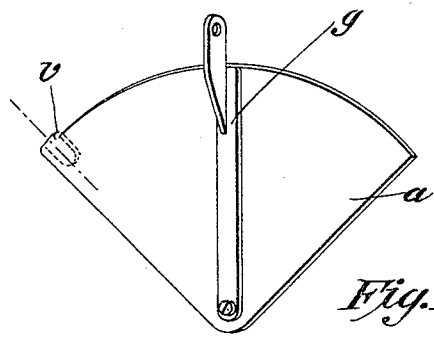
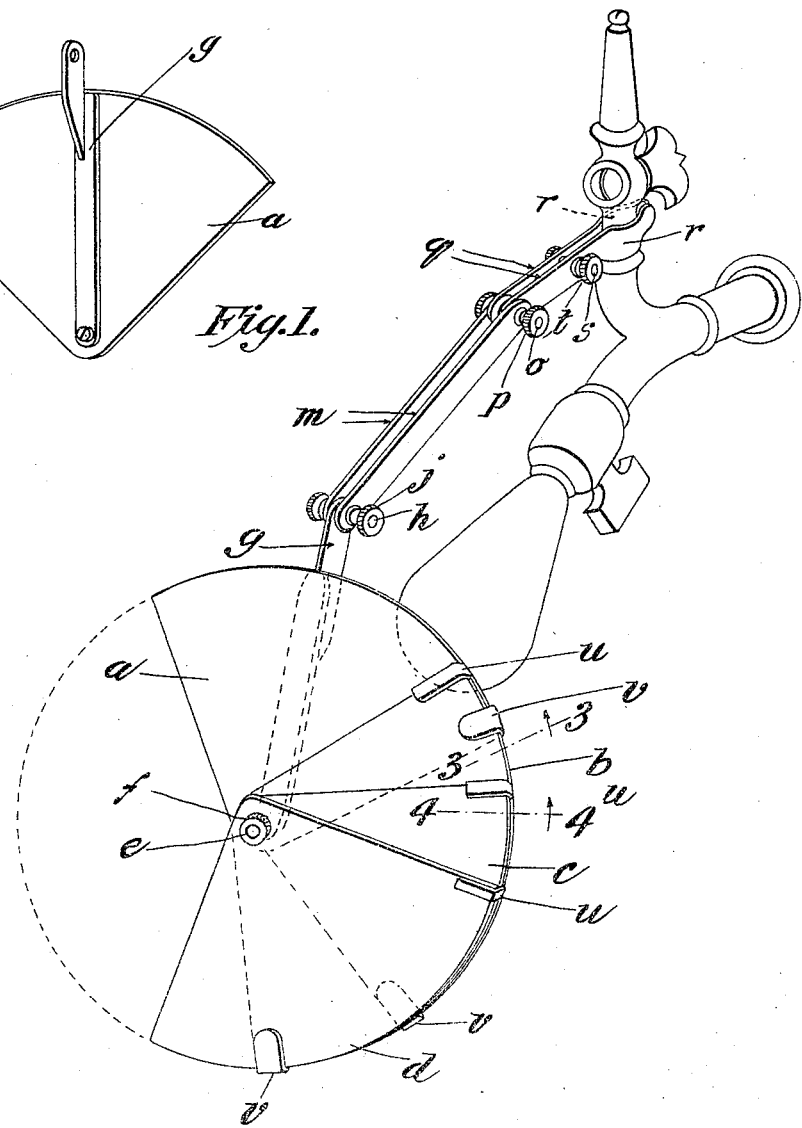
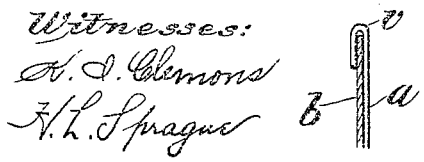
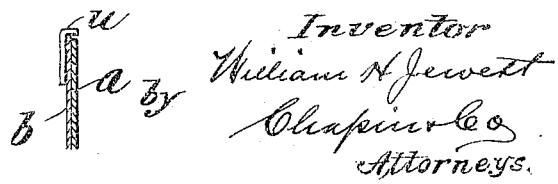

No. 774,477.

Patented November 8, 1904.

UNITED STATES PATENT OFFICE.

WILLIAM H. JEWETT, OF HOLYOKE, MASSACHUSETTS.

ADJUSTABLE SHADE.

SPECIFICATION forming part of Letters Patent No. 774,477, dated November 8, 1904.

Application filed June 22, 1904. Serial No. 213,660. (No model.)

*To all whom it may concern:*

Be it known that I, WILLIAM H. JEWETT, a citizen of the United States of America, residing at Holyoke, in the county of Hampden and State of Massachusetts, have invented new and useful Improvements in Adjustable Shades for Gas and Electric Lamps, of which the following is a specification.

This invention relates to shades for gas or electric lamps particularly, the object of the invention being to provide an adjustable shade which may be swung to any desired position in vertical and horizontal planes to locate it between the light and the object to be screened, means being provided to vary the area of the shade proper, whereby the light may be permitted to fall only on a certain portion of an object.

The invention consists in the construction described in the following specification and particularly pointed out in the claims appended thereto.

In the drawings forming part of this application, Figure 1 is a perspective view of a shade embodying the invention, the same being shown as attached to a bracket-light. Fig. 2 is a perspective view of one of the segmental sections of the shade. Fig. 3 is a sectional view of a portion of a shade on line 3 3, Fig. 1; and Fig. 4 is a similar view in the plane of line 4 4, Fig. 1.

Referring to the drawings, the shade proper is made up of a number of segment-shaped sections $a$, $b$, $c$, and $d$, which may be of metal or any other suitable material, each of which is substantially triangular in shape and pivotally supported together in superposed relation on a bolt $e$, provided with a nut $f$, the peripheries of these sections being curved to the end that in their extended position they will collectively constitute a circular shade. One of the sections, $a$, is immovable and has secured to the rear side thereof a rib $g$, whose outer end extends beyond the periphery of said section and which end is perforated to receive a bolt $h$, which is provided with the nut $j$, whereby the arm or arms $m$ may be pivotally secured thereto, the nut $j$ serving to rigidly unite said arms to the rib $g$ in any adjusted position. The opposite end of the arm is provided with a bolt $o$ and a nut $p$, similar to the bolt $h$ and nut $j$, and by means of the bolt $o$ the clamping-arms $q$ are secured to said arms $m$ adjustably. The free ends of these arms $q$ have the circular-shaped jaws $r$ formed thereon, adapted to embrace a gas-pipe, as shown, or some convenient part of an electric-lamp bracket. Between the jaws $r$ and the bolt $o$ is another bolt $s$ and nut $t$, whereby the jaws $r$ may be clamped securely to the gas-pipe or other part which is to support the shade.

From the foregoing description it is seen that by means of the adjustable arm the shade may be supported wherever it is convenient on some portion of a lamp or gas bracket or pendant and that as much or as little of an object to be screened may be thrown in the shadow by means of the adjustable circular shade. The circular form of the shade when closed permits the sectional parts $b$, $c$, and $d$ to be all swung opposite the fixed segment $a$ and there secured by means of the nut $f$, or the segments may be opened more or less.

The various segments are provided with interlocking stops, whereby when one segment— as $b$, for example—has been swung around on the bolt $e$ as far as possible without separating its edge from the edge of the segment $a$ it will be arrested in its swinging movement by the engagement of the stop $u$ with the stop $v$. The latter is formed from a strip of metal either integral with the segmental section to which it is attached or secured thereto in any suitable way, the free end of said strip being bent over to embrace the edge of that one of the other segments which slides thereon, said hook being so formed that the two segments may have a freely-sliding movement one relative to the other. The stop $u$ is similar to the stop $v$ except that it is not necessary that it should have a hook engagement with the edge of the segment on which it slides, it being only necessary that it should be unable to pass the stop $v$. On all of the segments except $a$, which is fixed, the stop $v$ will be located at one end thereof, and at the opposite end and on the opposite side of the plate will be located the stop $u$. Thus when the segments of the shade are extended to increase its area the stop *u* on the segment *b* will come in contact with the stop *v* on the segment *a*, and on the segment *c* the stop *u* will be arrested by contact with the stop *v* on the segment *b*, and so on. When the segments are swung the other way, however, to fold up or reduce the area of the shade, the segment *b* may be swung over the segment *a* to the left until the stop *v* thereon is arrested by the stop *v* on the segment *a*. Then *c* may in like manner be swung over the segment *b* until the stops *v* thereon abut against the like stop on the plate *c* and so on. This movement of the plates is possible, for the reason that in swinging to the left the stops *u* on the segments *c* and *d* will easily spring over the stops *u* thereon. In Figs. 3 and 4 the arrangement of these stops relative to the plates is very clearly illustrated.

Having thus described my invention, what I claim, and desire to secure by Letters Patent of the United States, is—

1. A shade of the character described consisting of a shade-supporting arm comprising several jointed members adjustably secured together, a clamping device on one end of said arm, a circular shade supported on the opposite end of said arm and consisting of a plurality of segmental sections united together at the apex thereof in superposed relation, said supporting-arm being secured to one of said sections at the periphery thereof.

2. A shade of the character described consisting of a plurality of segmental sections pivotally united in superposed positions to constitute, when extended, a circular shade; stops on said sections to limit the movement thereof one relative to the other, a bolt constituting the axis of said sections, and a nut on the bolt to secure the sections rigidly together, in combination with a supporting-arm comprising several members adjustably secured together, said shade being secured to one end of said arm by its periphery; and a clamping device associated with the opposite end of said arm.

WILLIAM H. JEWETT.

Witnesses:
Wm. H. Chapin,
K. I. Clemons.